United States Patent Office 3,168,025
Patented Feb. 2, 1965

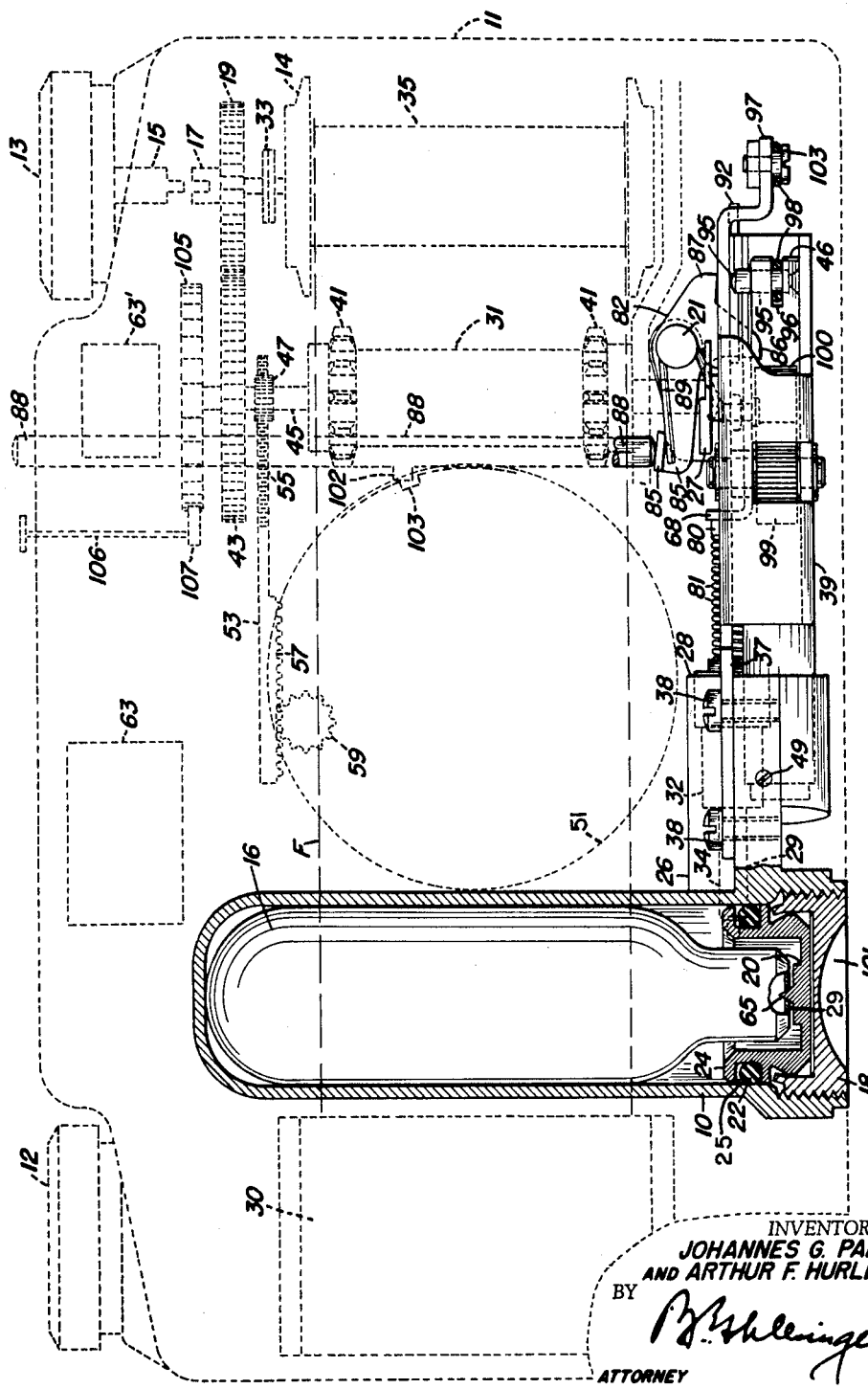

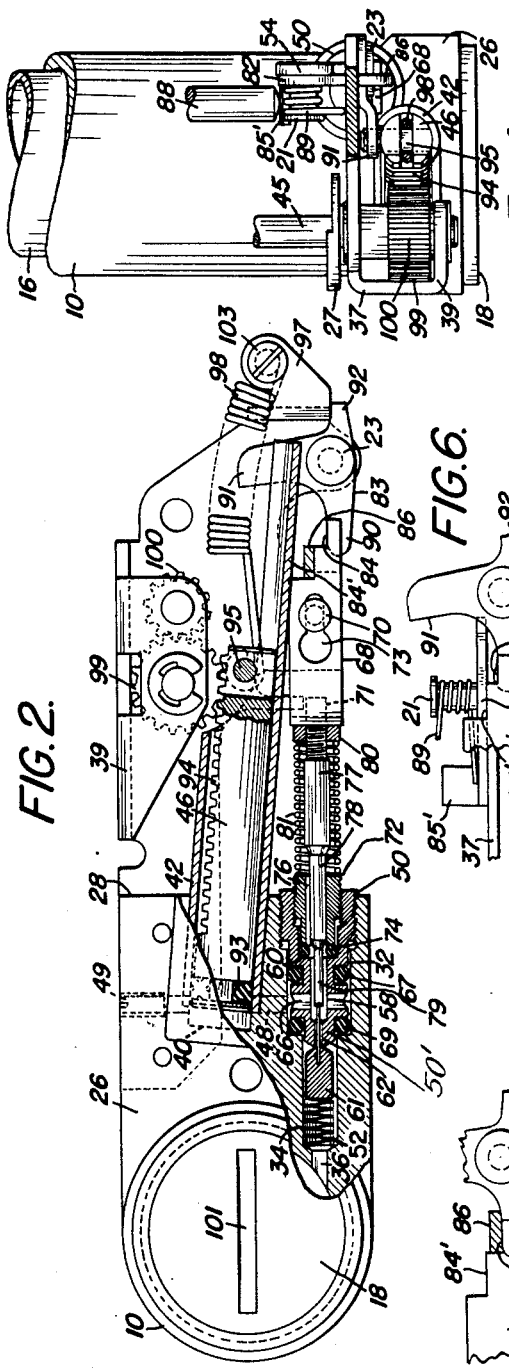

3,168,025
PHOTOGRAPHIC CAMERA
Johannes G. Padelt, Rochester, and Arthur F. Hurlburt, Fairport, N.Y., assignors to Graflex, Inc., Rochester, N.Y., a corporation of Delaware
Original application May 3, 1957, Ser. No. 656,830, now Patent No. 3,039,441, dated June 19, 1962. Divided and this application May 8, 1962, Ser. No. 193,185
16 Claims. (Cl. 95—31)

The present invention relates to photographic cameras, and more particularly to the film-transporting and shutter-cocking mechanisms for photographic cameras. In a still more specific aspect the invention relates to film-transporting and shutter-cocking mechanism for so-called miniature or candid cameras. This application is a division of our pending application Serial No. 656,830, filed May 3, 1957, now Patent No. 3,039,441, granted June 19, 1962.

In conventional cameras for taking still pictures, the film is transported or advanced by manually rotating a take-up spool after each picture, to move the exposed film out of, and to move unexposed film into, the exposure area of the camera. Frequently it is an inconvenience to have to rotate the take-up spool manually; and sometimes movement of the film is overlooked, so that a double exposure occurs.

One object of the present invention is to provide a photographic camera having means for automatically transporting the film after each exposure.

Another object of the invention is to provide a camera having means for automatically cocking the shutter after each exposure.

Another object of the invention is to provide a camera in which the same power means actuates both the film transport mechanism and the shutter-cocking mechanism automatically after each exposure.

Another object of the invention is to provide a camera capable of effecting a plurality of exposures in rapid succession.

Another object of the invention is to provide a camera of the character described in which the shutter will go through its full exposure cycle before the mechanism starts to advance the film.

Another object of the invention is to provide a camera of the character described in which the film-transport mechanism will not operate until the shutter has completed its cycle, regardless of the length of exposure.

Another object of the invention is to provide a film-transport unit for a camera that is powered by means of compressed air, or any other suitable compressed gas.

Another object of the invention is to provide a camera of the character described in which the film-transport mechanism and/or the shutter cocking mechanism are fluid-pressure actuated from a gas cylinder contained within the camera and holding a sufficient supply of compressed actuating gas to effect any desired number of exposures, for instance, two hundred or more, without refilling or renewal.

A further object of the invention is to provide a camera of the character described in which the actuating gas is supplied from a removable cartridge or bulb that can be replaced in a few seconds by a new cartridge or bulb when its compressed gas supply is exhausted.

Still another object of the invention is to provide in a camera of the character described a power unit that will be light in weight, compact, simple and efficient in operation, and one which needs only to be tripped to perform its cycle.

Other objects of the invention will be apparent hereinafter from the specification and from the recital of the appended claims.

In the drawings:

FIG. 1 is a view looking from the rear and with the rear cover of the camera removed, and showing a power unit constructed according to one embodiment of the present invention connected to actuate the film-transport mechanism and the shutter cocking mechanism of the camera, the camera casing and parts of the shutter-tripping, the film-transport and the shutter-cocking mechanisms being shown in dotted lines, and the container, which houses the gas cartridge, being shown in section;

FIG. 2 is a bottom view of the power unit, parts thereof being broken away and shown in section, and the piston, which actuates the film-transport and shutter-cocking mechanisms being shown at the end of its return stroke;

FIG. 3 is a similar view but with the piston at the end of its power stroke;

FIG. 4 is a fragmentary end view of the unit looking from the right in FIG. 1, parts being broken away and shown in section;

FIG. 5 is a fragmentary view showing the two bell cranks and the slide which moves the valve mechanism in one direction, fragmentarily, the bell cranks being shown in a position intermediate the positions of FIGS. 2 and 3; and FIG. 6 is a fragmentary bottom view further illustrating the relation of the bell crank levers, they being shown in a position corresponding to the position of FIG. 1.

The invention is illustrated as employed in a camera using perforated film, and a toothed sprocket for metering the amount of film transported on each cycle.

In the embodiment of the invention illustrated in the drawings, the power unit for transporting the film and for cocking the shutter comprises a piston that reciprocates in a cylinder and that is connected through rack and gearing, and a one-way clutch to the transport and metering sprocket, so as to drive the sprocket on movement of the piston in one direction on its power stroke. The sprocket is geared to the take-up spool of the camera through a friction clutch and is connected to the shutter cocking mechanism so that when the sprocket is driven, the shutter will be cocked, and the take-up spool will be rotated to take up the film.

The piston is driven on its power stroke by a compressed gas supplied to one end of the cylinder from a small, replaceable bulb or cartridge that is removably stored in the camera. The gas is exhausted to atmosphere from this one end of the cylinder for the return stroke of the piston. The piston is driven on its return stroke by a spring that is cocked on the power stroke of the piston.

The movement of the piston is controlled by a reciprocable valve that is constantly urged by a spring and gas pressure toward closed position, to shut off flow of the gas from the cartridge to the cylinder. This valve is opened against resistance of its spring and gas pressure by movement of an axially-aligned, axially-reciprocable valve rod, that is also constantly pressed by a spring in the direction to permit closure of the valve.

A bell-crank is provided to move the valve rod in the direction to open the valve. The valve rod is fixedly secured to a slide. This slide has a notch in one end. Normally the bell-crank is disposed at one side of the slide and out of registry with this notch. A release rod is provided, which, when pressed downwardly, trips the camera shutter to effect picture taking, and swings the bell-crank in one direction about its pivot until one arm registers with the notch. Then a spring, that is coiled about the pivot stud of the bell-crank, snaps this arm of the bell-crank into the notch.

The release rod is released as soon as the picture has been taken. This permits the spring to rock the bell crank in the opposite direction thereby forcing the valve rod to valve-opening position against the resistance of the gas pressure and of the spring which is associated with the valve and valve rod.

The valve rod is so constructed that when it opens the valve it simultaneously closes off exhaust of gas from the cylinder to atmosphere. As soon as the valve is opened, the compressed gas flows from the bulb or cartridge into the cylinder to effect the power stroke of the piston, transporting the film and cocking the shutter. At the end of the power stroke, the piston rocks a second bell-crank which kicks the first bell-crank out of its notch. This releases the valve rod, permitting the valve spring and gas pressure to reclose the valve, and return the valve rod to its normal position. This shuts off flow of the gas to the cylinder, and opens the cylinder to atmosphere so that the gas is exhausted from the cylinder. Then the piston spring, which was cocked on the power stroke of the piston, effects the idle return stroke of the piston. The parts are now in rest position, ready for the next picture-taking cycle.

Referring now in detail to the drawings, 11 denotes the casing of the camera, 12 its manually-rotatable rewind knob, and 13 the knob for manually rotating the film take-up spool in an emergency. The knob 13 is mounted in the casing 11 to be depressible against resistance of a spring (not shown), in order to engage the male coupling member 15, which is connected to knob 13, with a female coupling member 17 which is secured to a gear 19. The gear 19 is connected by a conventional friction clutch 33 with the take-up spool 35 of the camera. This spool is rotatably mounted in conventional manner in the camera casing 11.

The automatic film transporting mechanism of the present invention is illustrated in the drawings in connection with a camera using film which has perforations along its opposite lateral edges. The film is adapted to be advanced from the film cartridge 30 by rotation of a feed sprocket 31, which operates to meter the amount of film advanced each time the film transport mechanism is actuated. The sprocket 31 is provided with two axially-spaced sets of circumferential, uniformly-spaced teeth 41 adjacent its upper and lower ends, respectively, to engage the perforations in the film, to feed the film on rotation of the sprocket. The sprocket is geared to the take-up spool 35 by meshing gears 43, 19 and the friction clutch 33. Gear 43 is secured to the upper end of the spindle 45 to which the sprocket is fastened.

The spindle 45 is connected in any suitable or conventional manner with the shutter cocking mechanism of the camera, so as to cock the shutter when the film is transported. This connection may comprise a spur pinion 47 that is secured to the shaft or spindle 45, and a rack bar 53 reciprocable longitudinally in the casing and having racks 55 and 57 at opposite ends. Rack 55 meshes with the pinion 47; and rack 57 meshes with a spur gear 59 that drives the coking ring or other shutter cocking mechanism (not shown) of the camera.

51 denotes the opening in the front of the camera casing for the objective lens mount of the camera; and 63, 63' denote the windows of the combined viewfinder, rangefinder system of the camera.

Provided within the camera casing is a container or storage compartment 10 for a conventional cartridge 16 containing compressed air or other gas, such as carbon dioxide.

The compartment 10 is closed at its bottom by a piercing and sealing member 20, which is generally cup-shaped, and which has a skirt portion 24 that surrounds the neck of the gas cylinder 16, but is spaced radially therefrom. This skirt portion has a peripheral groove 25 in which is mounted an O-ring 22. The member 20 has a prong 65 which is disposed centrally of the bottom thereof to project upwardly when the sealing member is in place. This prong is adapted to pierce the cover 29 of the cartridge 16 to permit escape of the compressed gas from the cartridge. The sealing member 20 is held in position by a nut 18 that threads into the bottom of the compartment 10. A kerf 101 is provided in the bottom of this nut to receive a coin, or screwdriver or other tool for rotating the nut 18.

The housing or compartment 10 is formed adjacent its lower end with a laterally extending portion 26. Secured to this portion 26 by means of screws 38 is a bracket 37, which is reversely bent upon itself along one lateral edge, as denoted at 39, to provide spaced parallel bearing portions, the purpose of which will be described later.

Mounted in the laterally-extending portion 26 of the housing 10 to project laterally beyond the end 28 thereof is an open-ended tube 42, constituting a cylinder, in which there is reciprocably mounted a piston 46. This piston has a peripheral groove in it adjacent its inner end in which is mounted a rubber sealing quad-ring 93. The piston is provided along one side with rack teeth 94 which mesh with the teeth of a spur gear 99, that is journaled at opposite ends in the spaced parallel bearing portions 39 of the bracket 37. The gear 99, in turn, meshes with a spur pinion 100 that is integral with a one-way coupling member 27 (FIG. 1) through which it is connected with the film transport and metering sprocket 31. Thus, as the piston 46 moves outwardly in the tube 42, it drives the transport and metering sprocket, and through the transport and metering sprocket drives the take-up spool, to take up the film.

The piston 46 is moved outwardly on its power stroke by gas pressure. It is moved in the opposite direction on its return stroke by the negator spring 98, which is secured at one end by means of a stud 103 to a downwardly bent arm portion 97 of the bracket 37, and which is secured at its opposite end by means of a stud 95 to the outer end of the piston 46. A slot 96 is provided in the piston to receive the inner end of the spring 98.

For supply of the compressed air or other gas to the tube or cylinder 42 to effect outward movement of the piston 46 there is a port or duct 36 provided in the wall of the housing 10. This port leads from housing 10 into a chamber 34, which is of somewhat larger diameter than the port 36 (FIGS. 2 and 3). This chamber 34 in turn communicates with a still larger diameter valve chamber 32.

Threaded into the outer end of the valve chamber 32 is a valve 50, that is formed within the chamber 32 with a cross duct 66 that extends diametrically through the valve. Between this cross duct 66 and its outer end the valve is formed with a peripheral groove, in which there is mounted an O-ring 67. The valve is of reduced diameter adjacent its inner end 50' and at the opposite side of cross duct 66, to provide a second peripheral recess in which another O-ring 69 is mounted. This latter O-ring seats against the shoulder formed at the juncture of the chambers 32 and 34.

Threaded into the outer end of the valve 50 to project inwardly thereinto is a bleeder sleeve 72. This sleeve serves to seat an O-ring 74 against the shoulder 60 formed internally in the valve. The valve 50 has a bore portion 62 of very small diameter leading from its inner end outwardly. This bore portion communicates with an aligned bore portion 58 of larger diameter, and this bore portion 58 communicates, in turn, with the bore of the bleeder sleeve 72.

Mounted to reciprocate in the bore of the bleeder sleeve 72 and in the axially aligned bore 58 of the valve 50 is a valve rod 77. The portion 79 of the valve rod, which projects into bore 58, is of reduced diameter as compared with the main portion 78 of the valve rod; and the two portions are connected by a conical portion 75 which in itself constitutes a valve.

Mounted to reciprocate in the reduced diameter bore portion 62 of the valve 50 is a needle valve 64, which engages at its outer end in a concave V-shaped recess in the inner end of the valve rod 77, and which is secured at its inner end in a plug 61. The plug 61 is constantly urged toward engagement with the inner face of the valve 50 by a coil spring 52, which is interposed between the inner end of the plug 61 and the inner end of the chamber 34.

The chamber 32 of the valve 50 is connected, approximately opposite the cross duct 66, by a duct 48, with a recess 40 in lateral extension 26 that forms the inner end of cylinder 42. Duct 48 is drilled into the lateral extension 26 of housing 10, and is closed at its outer end by a plug 49 that threads into this extension. At the inner end of its movement piston 46 stops short of the inner end of recess 40 so that some space is provided between the inner end of the tube 42 and the piston in its innermost position, to permit the compressed gas to act against the inner end of the piston.

The valve rod 77 is constantly urged outwardly by a coil spring 81 which surrounds the external portion of the rod, and which is interposed between the outer face of the bleeder sleeve 72 and a nut 80 that is threaded on a threaded extension 71 of the valve rod. This threaded extension 71 threads into a slider 68, and serves to secure the valve rod rigidly to the slider. Sliding movement of the slider is limited by a stud 70 which is fixed in bracket 37 and which engages in a key slot 73 in the slider.

Opening of the valve plug 61 against the resistance of gas pressure and springs 52 and 81 is effected by counterclockwise movement of the bell-crank 82 from the position shown in FIG. 1. This bell-crank is pivotally mounted by means of a stud 21 on a tank 54 (FIG. 4) which is struck up from the bracket 37. The bell-crank 82 is formed with arms 85 and 86 and with a tail 87. The arm 86 extends downwardly substantially at right angles to the arm 85, and its end normally rests along the side of the notch 84' in the slide 68, as illustrated in FIGS. 3 and 5. The tail 87 of the bell-crank is adapted to engage against the upper surface of the bracket 37 to serve as a stop to limit the angular movement of the bell-crank 82 in a clockwise direction. A coil spring 89, which surrounds the stud 21, and which engages at one end against a ledge 85' (FIG. 1) on the arm 85 of the bell-crank 82 and at its opposite end against the bracket 37, serves to urge this bell-crank constantly in a clockwise direction about the stud 21, as viewed in FIG. 1, to hold the ledge or flange 85' in engagement with the shutter release rod 88. The spring 89 acts not only constantly to urge the bell-crank 82 in a clockwise direction, but also operates, when placed under tension, to urge the bell-crank axially to the right in FIG. 4.

The shutter release rod 88 may be of conventional construction to trip, on movement downwardly, the shutter-actuating mechanism of the camera. The release rod has a lug 102 (FIG. 1) at one side thereof positioned to engage and trip the shutter release member 103 as the release rod is pushed downwardly.

The slider 68 has a second notch 84 (FIGS. 2, 3, 5 and 6) in it which is displaced laterally and longitudinally of the slider from notch 84'. When the bell-crank 82 is rocked counterclockwise about its pivot stud 21 against the resistance of spring 89 by downward movement of release rod 88, the arm 86 of the bell crank slides along the side of notch 84' (FIGS. 2, 3 and 6) until it clears this notch. Thus it snaps into notch 84 under the axial pressure exerted by spring 89. The position of arm 86 at this instant is shown in FIG. 5.

When the release rod 88 is released by the photographer, spring 89 rocks the bell-crank clockwise. This causes the arm 86 of the bell-crank, which is now engaged against the lateral shoulder, that is formed on slider 68 by notch 84, to force the slider 68, valve rod 77, needle valve 62 and valve plug 61 to the left from the positions shown in FIG. 2 to the positions shown in FIG. 3. This opens up the line to permit flow of the compressed air or other gas from housing 10 through port 36, chamber 34, and ducts 62, 66, and 48 into the left hand end of cylinder 42, as viewed in FIGS. 2 and 3, forcing the piston 46 to the right, driving sprocket 31 through gearing 94, 99, 100, and one-way clutch 27, and driving take-up spool 35 through gearing 43, 19 and friction clutch 33 to transport the film, and driving the shutter cocking mechanism through gearing 47, 55, 57, 59 to cock the shutter.

To disengage the arm 86 of the bell-crank 82 from the notch 84 in slider 68 at the end of the power stroke of the piston 46, a second bell-crank 83 is provided. The bell-crank 83 (FIGS. 2 and 3) is pivotally mounted by means of a stud 23 on the bracket 37 for rotation about an axis at right angles to the axis of rotation of bell-crank 82. One arm 91 (FIGS. 2, 3 and 6) of the bell-crank 83 is positioned so that it will be struck and rocked by the pin 95, which is mounted in the outer end of the piston 46, when the piston moves on its power stroke from the position shown in FIG. 2 to that shown in FIG. 3. Another arm 90 of this bell-crank 83 is positioned to engage the arm 86 of the bell-crank 82. When pin 95 strikes arm 91 of bell-crank 83, this bell-crank will be rocked clockwise from the position shown in FIG. 5 to that shown in FIG. 3. This will kick the arm 86 of bell-crank 82 out of notch 84 in slider 68 (as shown in FIG. 3). Gas pressure and springs 63 and 81 will then close valve plug 61, and through needle valve 62 and valve rod 77 will open bleeder slot 76. Supply of compressed air or gas to the cylinder 42 will then cease, and instead the left hand end (as viewed in FIGS. 2 and 3) of cylinder 42 will be put on exhaust to atmosphere through ducts 48, 66, 58 and channel or groove 76 in bleeder 72. Immediately then spring 98 will return the piston 46 from the position shown in FIG. 3 to that shown in FIG. 2. The cycle will be complete. The tail 92 of the bell-crank 83 is adapted to engage the downturned portion of the bracket 37 to limit the movement of the bell-crank 83 in a counter clockwise direction as viewed in FIG. 3.

For another picture-taking operation, the release rod 88 is again manually depressed, and the cycle proceeds as described above. On downward movement of release rod 88, the shutter is tripped; and the film-transport mechanism is triggered. As soon as the rod 88 is released by the photographer, the film-transport and shutter cocking mechanisms are actuated as above described.

To prevent retrograde movement of the transport and metering sprocket 31 and of take-up spool 35 during any return movement of piston 46, a ratchet wheel 105 and pawl 107 (FIG. 1) are provided. The ratchet wheel 105 is secured to the shaft 45 of the sprocket 31; and the pawl 107 is disposed in engagement with the teeth of the ratchet wheel so as to permit rotation of the wheel with the sprocket during film transport, but to prevent retrograde movement of the sprocket.

In an ordinary cartridge 16 there may be a sufficient charge of compressed air or other gas to complete as many as two hundred picture-taking cycles. Thus, several rolls of film may be used up before the supply of gas in cartridge 16 is exhausted. An interlock may be provided through the counter mechanism of the camera to prevent depression of release rod 88 when the gas in the cartridge 16 is used up.

After all the film F on a roll has been exposed, the film has to be rewound into the film cartridge or cassette 30 (FIG. 1) by rotation of rewind knob 12. To permit rewinding of the film, the rod 106 is rocked about its axis to disengage pawl 107 from ratchet wheel 105.

The operation of the mechanism will be understood from the preceding description, but may be briefly summed up here.

When a picture is to be taken, the release rod 88 is pushed downward, in FIG. 1, to rock the bell-crank 82 counterclockwise. As the bell-crank 82 is rotated, the actuating spring 89 is compressed, and the arm 86 of the bell-crank 82 is moved from its at-rest position (shown in FIG. 2) in notch 84' into notch 84 of slider 68, as shown in FIG. 5. While the release rod 88 is held depressed, the bell-crank 82 is held immobile, and the arm 86 is also immobile.

When the exposure has been completed, and the release rod 88 has been released, the actuating spring 89 will rotate the bell-crank 82 in a clockwise direction, forcing the slider 68, valve rod 77, needle valve 62, and valve plug 61 to the left, to the positions shown in FIG. 3. As the valve rod 77 moves to the left, the portion 78 thereof in conjunction with the O-ring 74 seals off communication between the duct 58 and atmosphere. When the plug 61 is opened, compressed gas flows from the housing 10, through duct 36, chamber 34, ducts 62, 66, and 48 into cylinder 42. This forces the piston 46 to the right from the position shown in FIG. 2 to that shown in FIG. 3. As the piston travels to the right, the rack 94 rotates gear 99, which drives the film transport mechanism, and the piston return spring 98 is compressed.

As the piston approaches the end of its power stroke, the stud 95 engages the arm 91 of the bell-crank 83, rocking the bell-crank 83 clockwise. This causes the arm 90 of the bell-crank 83 to kick the arm 86 of the bell-crank 82 out of the notch 84 in the slide 68, into the notch 84' again, as shown in FIG. 3. The springs 81 and 63 thereupon expand to force the valve rod 77 and the valve plug 61 to the right.

As the valve rod 77 moves to the right, the portion 78 of the valve rod is withdrawn from engagement with the O-ring 74, to the position shown in FIG. 2, to permit exhaust of the pressure fluid from the cylinder 42 through the ducts 48, 66, and 58, and the bleeder slot 76 to atmosphere. Simultaneously, the plug 61 closes, stopping flow of gas from the housing 10.

The piston return spring 98 thereupon forces the piston 46 to the left to reset the mechanism.

While the invention has been described in connection with a preferred embodiment thereof, it will be understood that it is capable of modification. Thus, for example, while it is preferred that the compressed gas be obtained from replaceable gas cartridges, a refillable gas chamber forming a permanent part of the camera might instead be employed. Moreover, the gas chamber can be constructed so that the gas cartridge can be stored in the hollow core of a roll of film. Then, the cartridge can be inserted into the camera simultaneously with the roll of film, to insure that there will always be an adequate supply of gas under pressure.

Further, while the piston has been shown as moved in one direction by a spring, it is within the contemplation of the invention to move it in both directions by gas pressure, suitable valving, of course, then being provided for such operation.

Still further, while the piston has been described as driving the metering sprocket through gearing, it might be used instead to cock a spring which would do the work for one cycle of film transport and shutter cocking.

While the invention has been described, therefore, in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. The combination with a camera having a rotary take-up spool, of means for rotating said spool to transport film comprising a cylinder, a piston reciprocable therein, a duct for supplying a pressure fluid to one end of said piston to move said piston in one direction, a valve movable between open and closed positions to control the periods of supply of the pressure fluid, manually positionable means for moving said valve to open position, and means operable by said piston to move said valve to closed position.

2. The combination with a camera having a rotary take-up spool, of a storage chamber for compressed gas, and means for rotating said spool comprising a cylinder, a piston reciprocable therein, a duct connecting said chamber with one end of said cylinder, and a valve movable in said duct between open and closed positions to control flow of gas through said duct.

3. The combination with a camera having a rotary take-up spool, of a storage chamber for compressed gas, and means for rotating said spool comprising a cylinder, a piston reciprocable in said cylinder, a first duct connected to said chamber, a second duct connected with one end of said cylinder, a third duct connected to atmosphere, a valve movable from a first position, in which the first and second ducts are connected to supply gas to said one end of said cylinder to move said position in one direction in said cylinder, to a second position in which the second and third ducts are connected, a spring for moving said piston in the opposite direction in said cylinder, manually positionable means for moving said valve to its first position, and means operable by said piston on its movement in said one direction in said cylinder to move said valve to its said second position.

4. The combination with a camera having a shutter, a rotary take-up spool, and shutter-cocking mechanism, of means for rotating said spool and actuating said shutter cocking mechanism comprising a storage chamber for compressed gas, a cylinder, a piston reciprocable in said cylinder, a first duct connected to said chamber, a second duct connected to one end of said cylinder, and a movable valve for controlling connection and disconnection of said ducts.

5. The combination with a camera having a shutter, a rotary take-up spool, and shutter-cocking mechanism, of means for rotating said spool and actuating said shutter-cocking mechanism comprising a storage chamber for compressed gas, a cylinder, a piston reciprocable in said cylinder, a first duct connected to said chamber, a second duct connected to one end of said cylinder, a movable valve for controlling connection and disconnection of said ducts, a valve-actuating member, said valve-actuating member being movable from an inoperative to an operative position, said valve-actuating member when in operative position being operative to move said valve in the direction to connect said ducts, a manually movable release member movable in one direction to release said shutter and to move said valve-actuating member to operative position, and means operated by said piston for moving said valve to the position to disconnect said ducts.

6. The combination with a camera having a manually operable release member, of a storage chamber for gas under pressure, a cylinder, a piston reciprocable therein, means operable by said release member to admit gas from said chamber to one end of said cylinder to move said piston in one direction from an at-rest position, spring means mounted constantly to urge said piston in the opposite direction, means operable by said piston on movement in said one direction to advance film in said camera, and means operable by said piston after movement thereof through a predetermined distance in said one direction in said cylinder to stop the flow of gas to said one end of said cylinder and to permit the escape of said gas therefrom, to permit said spring means to return said piston to its at-rest position.

7. The combination with a camera having a rotary take-up spool, of a cylinder, a piston reciprocable therein, means constantly urging said piston in one direction in said cylinder, a storage chamber for gas under pressure, a valve movable to connect in a first position thereof one end of said cylinder with said storage chamber to apply gas under pressure to said piston to move said piston in said cylinder in the opposite direction, said valve in a second position thereof connecting said one end of said cylinder with atmosphere, a sliding member mounted to shift said valve from said first position to said second position and having a recess therein, first spring means mounted constantly to urge said sliding member in a direction to move said valve to its said second position, a bell crank mounted for limited pivotal movement and formed with a pair of arms, one of which is adapted to engage in said recess, a manually-operable member mounted to engage against the other arm of said bell crank to rotate said bell crank to engage said one arm thereof in said recess, second spring means mounted constantly to urge said bell crank to rotate in a direction to move said sliding member in a direction to move said valve to its said first position, means operatively connecting said piston to said spool to rotate said spool to transport the film in said camera on movement of said piston in said opposite direction, and means operable after movement of said piston a predetermined distance in said opposite direction to disengage said one arm from said recess to permit said first spring means to move said sliding member to shift said valve to its said second position.

8. The combination with a camera having a rotary take-up spool, of a cylinder, a piston reciprocable therein, means constantly urging said piston in one direction in said cylinder, a storage chamber for gas under pressure, means including a valve connecting one end of said cylinder with said chamber to apply gas under pressure to said piston to move it in said cylinder in the opposite direction, a sliding member movable in opposite directions to open and close said valve, respectively, and having a recess therein, a first spring constantly urging said member in a direction to close said valve, a bell crank mounted for limited pivotal movement and formed with a pair of arms, one of which is adapted to engage in said recess, a second double-acting spring operatively connected to said bell crank and operable to urge said bell crank constantly in one direction about its pivotal axis and in one direction axially of said axis, a manually-operable member mounted to engage against the other arm of said bell crank to rotate said bell crank to permit said second spring to engage its said one arm in said recess, said second spring being of greater power than said first spring and operable, when said one arm is engaged in said recess to urge said sliding member in the direction to open said valve, means operatively connected to said piston and operable upon movement of said piston in said opposite direction to transport the film in the camera, and means operable after movement of said piston a predetermined distance in said opposite direction to discharge gas from said cylinder and to disengage said one arm from said recess to permit said first spring means to move said sliding member to close said valve.

9. The combination with a camera having a rotary take-up spool, of a cylinder, a piston reciprocable therein, means constantly urging said piston in one direction in said cylinder, a storage chamber for gas under pressure, a valve movable to connect in a first position thereof one end of said cylinder with said chamber to apply gas under pressure to said piston to move it in said cylinder in the opposite direction, said valve in a second position thereof connecting said one end of said cylinder with atmosphere, a slide member mounted to shift said valve from said one position to said second position and having a recess therein, a first spring mounted constantly to urge said slide member in the direction to move said valve to its said second position, a first bell crank mounted for limited pivotal movement and formed with a pair of arms, one of which is adapted to engage in said recess, a manually-operable member actuatable to engage against the other arm of said bell crank to rotate said crank to engage said one arm in said recess, a second double-acting coil spring operatively connected to said bell crank and constantly urging said bellcrank in one direction about and in one direction axially of its pivotal axis, said second spring being of greater power than said first spring and operable, when said one arm is engaged in said recess, constantly to urge said bell crank, in the direction to move said sliding member to move said valve to its said first position, means operatively connected to said piston and operable upon movement of said piston in said opposite direction to rotate said spool to advance the film in the camera, and a second bell crank mounted for limited pivotal movement about an axis angularly disposed to the pivotal axis of said first bellcrank and formed with a pair of arms, one of which is mounted to be engaged by said piston after movement of said piston a predetermined distance in said opposite direction and the other of which is mounted to engage against said one arm of said first bell crank to disengage said one arm of said first bellcrank from said recess upon rotation of said second bellcrank by said piston, whereby after movement of said piston a predetermined distance in said opposite direction in said cylinder, said second bell crank disengages said first bell crank from said recess to release said slide member to permit said first spring to move said slide member to shift said valve to its said second position.

10. The combination with a camera having a shutter, and a rotary take-up spool, of a storage chamber for compressed gas, means for rotating said spool comprising a cylinder, a piston reciprocable therein, means constantly urging said piston in one direction in said cylinder, a first duct connected to said chamber, a second duct connected to one end of said cylinder, a movable valve for controlling connection and disconnection of said ducts, said ducts when connected serving to supply compressed gas from said chamber to one end of said cylinder to move said piston in the opposite direction in said cylinder, means connected to said piston for rotating said take-up spool to transport film in the camera on movement of said piston in said opposite direction, a spring-actuated member movable from an inoperative position to an operative position to move said valve to the position in which said ducts are connected, and a manually-operable release member for said shutter movable in one direction to trip said shutter and to move said spring-actuated member to operative position, said manually-operable release member being operatively connected to said spring-actuated member so that said spring-actuated member cannot operate, though in operative position, until said release member is moved in the direction opposite to the direction of its shutter-tripping movement.

11. The combination with a camera having a shutter, cockable means for actuating said shutter, and a rotary take-up spool, of fluid-pressure operated means for rotating said spool to transport film, a valve for controlling supply of the pressure fluid to said fluid-pressure operated means, said valve, when open, permitting flow of the pressure fluid to said fluid-pressure operated means to actuate the same, a first member movable from an inoperative position to an operative position in which to open said valve, a spring for constantly urging said member to inoperative position, and a manually-movable shutter release member movable in one direction to trip said cockable means and to move said first member into operative position, said release member operating to prevent said first member from operating so long as said release member is manually held against return movement in the opposite direction.

12. The combination with a camera having a shutter, cockable means for actuating said shutter, a releasable member for normally holding said cockable means against operation, and a rotary take-up spool, of a movable fluid-pressure operated member for rotating said spool to transport film and for cocking said cockable means, a valve for controlling supply of the pressure fluid to said fluid-pressure operated member, said valve when open permitting flow of the pressure fluid to said fluid-pressure operated member to move the same in a direction to effect film-transporting rotation of said spool and cocking of said cockable means, an element movable from an inoperative position into operative relation with said valve, a spring operatively connected to said element constantly to urge said element to its inoperative position, said spring being operative when said element is in operative position to cause said element to move said valve to open position, and a manually-movable shutter release member movable in one direction from an initial position to trip said releasable member and to engage said element to move said element to operative position, said release member operating to prevent said spring from returning said element to inoperative position as long as said release member is manually held at the limit of its movement in said one direction, and said spring operating to return said release member to initial position when said release member is released.

13. A camera having a casing, a shutter movably mounted in said casing, a part movably mounted in said casing, fluid-pressure operated means mounted in said casing for actuating said part including a cylinder, a piston movable in said cylinder, means operatively connecting said piston to said part to move said part on movement of said piston relative to said cylinder, a container mounted in said casing and adapted to hold a supply of gas under pressure, a valve mounted in said casing and controlling flow of gas from said container to said cylinder, triggering means for said shutter mounted on said casing, means connecting said triggering means to said valve to open said valve upon actuation of said triggering means, a film transport mechanism mounted in said casing, and in which said part is operatively connected to said film transport mechanism to operate said film transport mechanism when said triggering means is actuated.

14. A camera as claimed in claim 13 having means for connecting said film transport mechanism to said shutter to cock said shutter during transport of the film.

15. A camera as claimed in claim 13 having a shutter-cocking mechanism, and in which said piston is connected operatively to said shutter-cocking mechanism to cock said shutter during transport of the film.

16. A camera as claimed in claim 13 having means for actuating the shutter, and means interlocking the shutter actuating means with the film transport mechanism to prevent operation of the film transport mechanism while the shutter is open.

References Cited in the file of this patent
UNITED STATES PATENTS

| | | |
|---|---|---|
| 1,083,734 | Johnson | Jan. 6, 1914 |
| 2,107,074 | Hineline | Feb. 1, 1938 |
| 2,940,438 | Merz | June 14, 1960 |